May 1, 1951  J. C. A. R. DA COSTA GOMES  2,551,422

MEANS FOR SETTING THE WEIGHT OF SCALES

Filed Nov. 18, 1948

Inventor
Joao C.A.R. DaCosta Gomes
By Haseltine, Lake & Co.
Agents

Patented May 1, 1951

2,551,422

UNITED STATES PATENT OFFICE 2,551,422

MEANS FOR SETTING THE WEIGHT OF SCALES

João C. A. R. da Costa Gomes, Lisbon, Portugal

Application November 18, 1948, Serial No. 60,779
In Portugal November 21, 1947

2 Claims. (Cl. 265—53)

The present invention relates to mechanical means for progressively loading the balance of scales or weighing machines.

One object of the invention is to enable the user of the scales to weigh quantities with ordinary weighing machines, i. e. other than automatic scales, by the simple expedient of reading the desired weight on a dial.

Another object of the invention is to enable the user of the scales to weigh quantities by the combined expedients of using weights on one tray of the scales and reading a quantity on a dial.

With these and other objects in view, the invention consists in the means hereinafter described with reference to the accompanying drawings, given by way of example, and in which.

Figure 1:
Fig. 1 is a diagrammatic view of a balance in the position of equilibrium without load.

Referring now to Fig. 1, tray $Pc$ is used for supporting the articles to be weighed, while $Pp$ is adapted for receiving calibrated weights. The balance arms of trays $Pp$ and $Pc$ are assumed to be of equal length.

According to the invention, a metal bar B is provided having one end C supported with minimum friction on the balance arm, the other end D being free. Bar B is supported at a point $Ap$ intermediate the ends thereof, said point being displaceable longitudinally of bar B. The support at point $Ap$ is also preferably with minimum friction, particularly in view of the sliding relationship between the support and the bar. Hence it is convenient to provide a non-friction bearing, for example a ball-bearing, on the mechanism controlling the displacement of point $Ap$.

Figure 2:
Fig. 2 is a similar view of the balance loaded in accordance with the invention.

In the example shown, point $Ap$ is displaceable from point E, where bar B has no effect on the equilibrium of the balance arm, to a point F adjacent the end D where the maximum effect is felt, as will be seen from Fig. 2.

Accordingly as point $Ap$ is moved gradually from E to F, the balance arm is progressively and continuously loaded, the load being in direct ratio to the distance $Ap$—E. The displacement of point $Ap$ along bar B may be controlled directly by hand, or through a rack and pinion or any other suitable means.

When point $Ap$ is at E, bar B has no effect on tray $Pp$ because the bar is itself balanced, or because its action on $Pp$ is compensated.

The maximum load and the sensitivity of the balance, i. e. the precision and accuracy and the unit value of load increments as a function of distance $Ap$—E, may be determined by the density of the metal chosen for bar B, by the cross-section of the bar which may vary longitudinally thereof, and also by the length of the bar. Hence it is possible to combine these three elements according to particular requirements.

The value of the load imposed on tray $Pp$ for each position of $Ap$ may be indicated on a linear scale or on a dial.

The load bar itself may have dimensions calculated according to the maximum capacity of the scales or for a predetermined capacity other than the maximum. In the latter event, for weighing quantities in excess of the capacity of the bar, use will be made of calibrated weights up to the maximum capacity, as is normally done with semi-automatic scales, the total being obtained by aggregating the indication on the dial with the values of the weights used.

The invention may be applied to all types of scales, with equal beams, with upper or lower suspension, with unequal beams having a decimal or other relationship, as well as to precision scales, bath-room and kitchen scales and all other types including commercial scales for use on counters, letter scales, baby scales and conventional rider scales, where the bar according to the invention may take the place of the rider.

Figure 5:
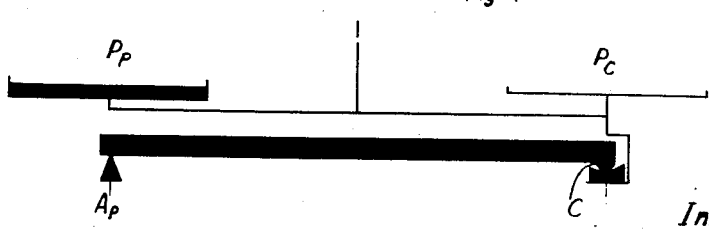
Figure 5 is a diagrammatic view of an alternative arrangement.

The bar may also be so arranged that it acts upon the tray adapted to receive the objects to be weighed instead of on the weights tray as indicated in Figure 5. In this event the scales will be so calibrated that it is in equilibrium when the action of the bar is at a maximum, and the bar will operate by gradually decreasing the load on the objects tray.

In the alternative arrangement shown in Figure 5 the weights tray $Pc$, upon which are placed calibrated weights, may also be provided with a tare in order to balance the scales when $Ap$ is at the position shown in the drawing. The objects tray $Pp$ is provided with means for supporting the ends C of the balancing bar which is provided, as in Figures 1 and 2, with a displaceable support point $Ap$. In order to weigh an article placed on objects tray $Pp$ the support $Ap$ is displaced towards C until balancing of the scales is achieved consequently to decreasing the load on the objects tray.

Figure 3:
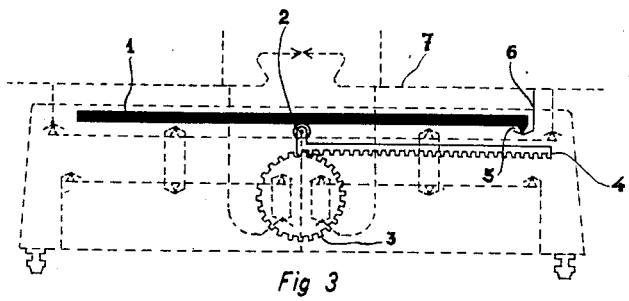
Fig. 3 is a partial view of one embodiment of the invention.

In Fig. 3 is shown by way of illustrative example, and in part only schematically, one manner of carrying out the invention. The scales is of the equal-arm type, the movable support of the bar 1 is for example a ball or roller bearing 2 the position of which may be varied longitudinally of bar 1 by actuating pinion 3 and thereby displacing rack 4 to which bearing 2 is connected. The other elements of the invention comprise means 5, 6 whereby bar 1 has a fixed point of support on tray 7.

Rotation of pinion 3 to shift rack 4 may be indicated on a dial coaxial with or in any other way responsive to movement of pinion 3. In scales for use on counters, a dial may be provided on each face of the apparatus visible respectively to the operator and to the customer.

Figure 4:
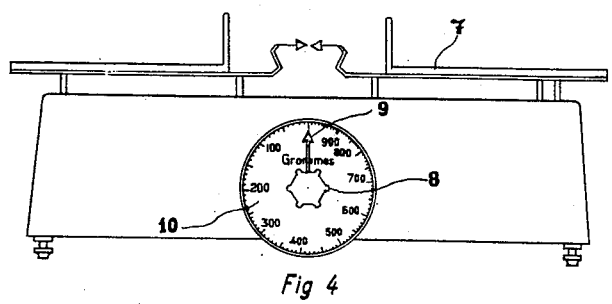
Fig. 4 is an elevation of a weighing machine equipped with the means of Fig. 3 showing the external appearance.

An example of commercial scales of this type is shown in Fig. 4 where hand-wheel 8 is connected to pinion 3 and to indicator 9 cooperating with dial 10. In use, hand-wheel 8 is rotated until indicator 9 is opposite the marking on dial 10 corresponding to the desired weight. The scales are thereby placed off balance in the same manner as if a corresponding weight had been placed on the loaded tray. Equilibrium is re-established by placing on the other tray a quantity equal to that shown on the dial.

The invention is not limited to the embodiments shown or described by way of illustrative example but extends to all scales falling within the spirit or scope of the appended claims.

What is claimed is:

1. A balancing bar for use with scales comprising a substantially horizontal bar having a suitably selected cross-section, one end of said bar being free and the other end supported on one of the movable parts of the scales, a support for said bar movable longitudinally thereof between a point intermediate the ends of said bar corresponding substantially to the center of gravity thereof and a point adjacent the free end thereof, and manually operable means for displacing said movable support.

2. A balancing bar as claimed in claim 1 wherein means are provided for indicating the linear displacement of said support relatively to said bar, said means comprising a scale and indicator means associated with said scale.

JOÃO C. A. R. DA COSTA GOMES.

REFERENCES CITED

The following references are of record in the file of this patent:

UNITED STATES PATENTS

| Number | Name | Date |
|---|---|---|
| 247,761 | Hopkins | Oct. 4, 1881 |
| 608,441 | Corbin | Aug. 2, 1898 |
| 1,484,358 | Norton | Feb. 19, 1924 |
| 2,376,608 | Lynch | May 22, 1945 |
| 2,410,138 | Werner | Oct. 29, 1946 |